United States Patent [19]

Wei et al.

[11] Patent Number: 4,590,075
[45] Date of Patent: May 20, 1986

[54] ELASTOMER ENCAPSULATION OF FLAVORS AND SWEETENERS, LONG LASTING FLAVORED CHEWING GUM COMPOSITIONS BASED THEREON AND PROCESS OF PREPARATION

[75] Inventors: You C. Wei, Randolph; Subraman R. Cherukuri, Towaco, both of N.J.; Frank Hriscisce, Long Island City, N.Y.; Dominic J. Piccolo, Hopatcong, N.J.; Kenneth P. Bilka, Floral Park, N.Y.

[73] Assignee: Warner-Lambert Company, Morris Plains, N.J.

[21] Appl. No.: 644,733

[22] Filed: Aug. 27, 1984

[51] Int. Cl.$^4$ ............................................... A23G 3/30
[52] U.S. Cl. ........................................... 426/5; 426/89
[58] Field of Search ....................................... 426/3–6, 426/658, 648, 89, 103

[56] References Cited

U.S. PATENT DOCUMENTS 3,857,964 12/1974 Yolles ........................................ 426/3
3,985,298 10/1976 Nichols ...................................... 426/3
4,217,368 8/1980 Witzel et al. ............................... 426/5
4,238,475 12/1980 Witzel et al. ............................... 426/3
4,386,106 5/1983 Merritt ...................................... 426/5
4,497,832 2/1985 Cherukuri .................................. 426/5

Primary Examiner—Jeanette Hunter
Attorney, Agent, or Firm—Daniel A. Scola, Jr.; Gary M. Nath

[57] ABSTRACT

A novel flavor/sweetener delivery system and chewing gum compositions prepared therefrom.

The chewing gum compositions have prolonged flavor and sweetener release and comprise
(a) a gum base; and
(b) a flavor and sweetener delivery system comprising flavor and/or sweetening agents encapsulated in a matrix comprising:
  (i) at least one elastomer;
  (ii) at least one elastomer solvent;
  (iii) at least one wax system;
  (iv) an excipient selected from the group consisting of carbohydrates, polyhydric alcohols and mixtures thereof; and
  (v) optionally spherical particles having microporous channels.

45 Claims, 2 Drawing Figures

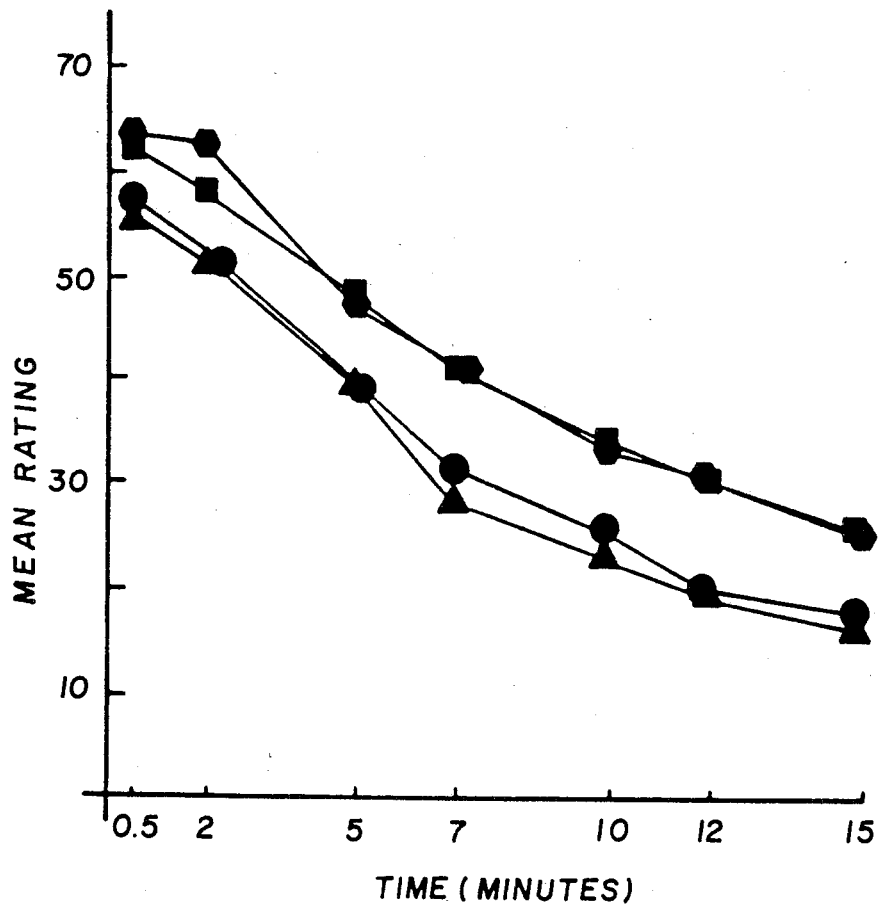

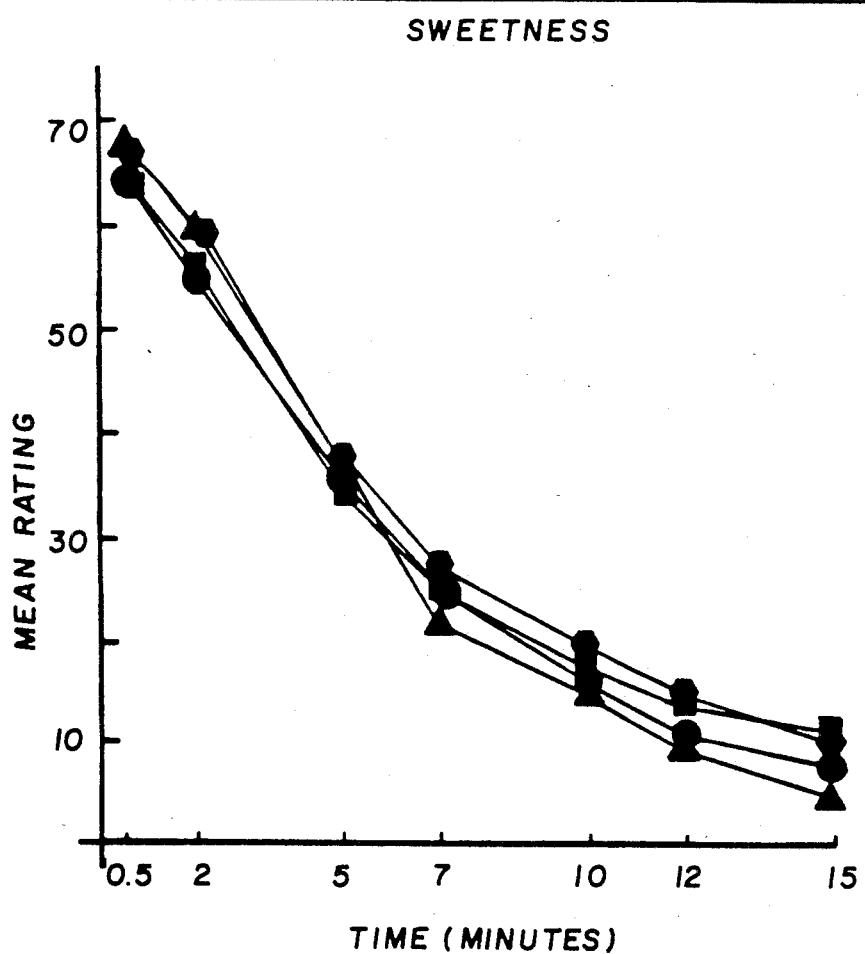

FIG. 2

MEAN RATINGS: AMOUNT OF SWEETNESS, BY TIME

KEY

■ INVENTIVE CHEWING GUM FORMULATION D (PEPPERMINT FLAVOR ENCAPSULATED IN MATRIX OF INVENTIVE DELIVERY SYSTEM.)

⬢ INVENTIVE CHEWING GUM FORMULATION C (PEPPERMINT FLAVOR AND SACCHARIN ENCAPSULATED IN MATRIX OF INVENTIVE DELIVERY SYSTEM.)

● COMPARATIVE A CHEWING GUM FORMULATION (PEPPERMINT FLAVOR ADDED DIRECTLY TO CHEWING GUM.)

▲ COMPARATIVE B CHEWING GUM FORMULATION BASED ON COMMERCIAL PEPPERMINT BRAND.

ELASTOMER ENCAPSULATION OF FLAVORS AND SWEETENERS, LONG LASTING FLAVORED CHEWING GUM COMPOSITIONS BASED THEREON AND PROCESS OF PREPARATION

The present invention relates to chewing gum compositions having a flavor and sweetener delivery system which allows for sustained flavor and sweetener release.

Most chewing gum compositions, including bubble gums, generally contain a water-insoluble gum base, water-soluble sweeteners that are either natural or artificial, and a flavoring that may be added in a variety of forms. Also, the gum may contain various additives such as plasticizers, softeners and bulking agents to improve consistency and to generally enhance the chewing experience.

A commonly noted deficiency in chewing gums has been the relatively rapid exhaustion of the flavor and sweetness sensation during chewing. This loss frequently occurs within the first 3 to 5 minutes of chewing.

The same problem is observed in the instance where the gum products are stored for a period of time between manufacture and consumption. The flavors appear to have limited shelf stability and, in some cases, are observed to diminish to an unacceptably low level within one month after storage.

Recently, it has become desirable to develop chewing gums and bubble gums having extended flavor and/or sweetener release. This has been accomplished usually by flavor and sweetener encapsulation techniques.

U.S. Pat. No. 3,920,849 to Marmo et al. addresses the concept of extended flavor release and offers a full discussion of the prior art on this subject. The patent directs itself to the preparation of separate flavor components identified as "fixed" (encapsulated) and "unfixed", which are mixed with a suspension agent prior to their addition to a chewing gum base. The patentees contend that this method of preparation and addition to the chewing gum offers improved flavor intensity and uniform flavor transmission. The patentees specifically employ a non-confined hydrophobic flavor oil and a "fixed" hydrolytically releasable flavor oil in combination with a solid suspending agent, as their flavor system. The preparation of the flavors is such that the resulting flavor system is added simultaneously to the gum base.

In similar fashion, U.S. Pat. No. 4,001,438 also to Marmo et al discloses a flavor composition utilizing a non-confined flavor oil in combination with a flavor oil physically entrapped within solid particles, and a suspending agent combined therewith. All of these ingredients are premixed and thereafter simultaneously added to the product to be flavored. It is significant that the flavor system of this patent is predicated upon an intimate admixture between the non-confined flavor oil and the entrapped flavor oil.

In contrast to the Marmo et al. technique, U.S. Pat. No. 3,826,847 to Ogawa et al. relates to encapsulation of flavoring oils with polyvinyl acetates, that is, high molecular weight material. The encapsulated oil is thereafter incorporated into a chewing gum base. Ogawa et al purport to achieve sequential flavor delivery by the modulation of the coating applied to the respective flavor particles.

While the foregoing patents have been directed to flavor release, the art has concurrently developed to achieve prolonged sweetness release. U.S. Pat. No. 4,217,368 to Witzel is representative of one means utilized to delay sweetener release. This patented system involves using two phases, a water-soluble phase consisting essentially of softener and a first sweetener in particulate form and a relatively water-insoluble phase consisting of a plurality of separate and distinct masses suspended in the water-soluble phase, each of said masses comprising gum base and particles of a second sweetener enveloped in the gum base.

U.S. Pat. No. 761,286 discloses prolongation of flavor by crosslinking the flavor with a water-insoluble hydrophilic polymer such as hydroxyethyl or hydroxypropyl acrylate or methacrylate.

U.S. Pat. No. 3,826,847 discloses a process for encapsulating seasoning agents in a high molecular weight water-soluble compound such as polyvinyl esters. Starches, proteins, gums and cellulose are also disclosed as useful encapsulants. The encapsulated particles are then distributed in the gum base.

U.S. Pat. No. 3,962,463 discloses a chewing gum having its surface impregnated with microencapsulated flavor particles. The flavor particles do not penetrate the surface of the gum and the interior of the gum is substantially free of flavor particles. The flavor particles are encapsulated in gelatin, waxes or polyethylene and are printed on the surface of the gum as an aqueous slurry.

U.S. Pat. No. 3,982,023 concerns the addition of L-aspartyl-L-phenylalamine methyl ester (APM) to a sugarless chewing gum composition in specific amounts to extend the flavor and sweetness duration of saccharin during mastication.

U.S. Pat. No. 4,064,274 discloses a chewing gum having poorly water-soluble particulate sweetener, such as the free acid form of saccharin, and a poorly water-soluble food acid dispersed in the gum base. The sweetener and food acid are extracted slowly during mastication due to their poor solubility in saliva.

U.S. Pat. No. 4,085,227 concerns a chewing gum having a finely divided poorly water-soluble sweetening agent and a finely divided poorly water-soluble food acid dispersed in the gum base as a means of extending sweetener release.

U.S. Pat. No. 4,452,821 concerns a confectionery product such as a chewing gum which has an inner and outer phase wherein an additive, such as a sweetener or aroma, is added to the inner phase as a solid solution therewith, and the inner phase comprises a wax with functional groups with which the additive is miscible and the outer phase comprises a second wax with which the additive is immiscible. The waxes disclosed as useful for the inner phase are generally higher fatty alcohols (waxy alcohols) and higher fatty acids with at least 15 C-atoms. The softening point of these waxes is 60° to 70° C. Beeswax is a common natural wax having these functional groups. The outer phase comprises a wax without functional groups such as paraffin waxes.

U.S. Pat. No. 4,157,401 discloses a chewing gum having improved flavor retention due to the inclusion of a limonene derivative in the gum base, said derivative inhibiting flavor migration during storage.

The instant invention concerns a novel chewing gum composition having sustained flavor and sweetener release such that when chewed for long periods of time the flavor and sweeteners perception is improved over the prior art.

The present invention utilizes a novel delivery system which comprises an encapsulating matrix to surround flavor and sweetening agents, thereby inhibiting release of flavor and sweetener and extending their perception organoleptically.

The encapsulating matrix used as a delivery system in the instant invention is substantially different from the chewing gum base used in traditional chewing gum compositions. Conventional gum base usually contains an elastomer, an elastomer solvent, and various other required ingredients such as fillers, softeners, plasticizers and emulsifiers. The emulsifier is required in order to mix properly the other ingredients into a homogenous gum base mass. The resultant mass is continuous in nature, i.e., remains together without individual ingredients separating out, due to the emulsification. Additionally, emulsifiers improve the mouth feel of the gum base by providing a slippery, smooth feeling and perception.

The inventive encapsulating matrix is distinguisable from traditional gum bases in that emulsifiers must not be present in any form. The matrix is substantially hydrophobic in nature, with the exception of the addition of small amounts of excipients which in some cases may be water soluble. The matrix, as discussed in detail below, comprises elastomer, elastomer solvent, a wax system and an excipient, all of which are used to encapsulate a flavor and/or sweetener and which delivers the flavor and/or sweetener very slowly over a long period of time when chewed in a chewing gum composition. The matrix must not have materials or ingredients present therein which would act as emulsifying agents, since the result would be a more rapid release of flavor and/or sweetener agents during mastication. Thus, the criticality of having a substantially hydrophobic, emulsifier-free matrix in order to obtain the long release properties is apparent.

The instant delivery system uses only the strong mechanical action of chewing to physically extract and release the flavor and/or sweetener from the encapsulating matrix and allow it to mix freely with saliva and other soluble chewing gum constitutents. Once the flavor and/or sweetener is physically extracted or released by means of chewing, it may be emulsified by emulsifying agents present in the traditional gum base. It must be noted, however, that the gum base emulsifiers do not come into contact with the flavor and/or sweetener until the flavor and/or sweetener is mechanically released from the encapsulating matrix. The result is a slow, prolonged release of the flavor and/or sweetener from the hydrophobic encapsulating matrix into the saliva during a substantially long period of chewing.

The instant chewing gum compositions may contain other flavors and/or sweeteners which may be added in a traditional, conventional manner during processing and which are released quickly and immediately upon chewing, to give an initial burst of flavor. Thus, the combination of an initial burst of flavor and/or sweetener with a slow, prolonged release of flavor and/or sweetener is also contemplated as an alternative within the scope of this invention.

In accordance with the present invention, a chewing gum composition is prepared having sustained flavor and sweetener release comprising:

(a) conventional chewing gum ingredients comprising gum base, carbohydrates, sugar alcohols, flavors, colors, emulsifiers, softeners and the like; and (b) a flavor and sweetener delivery system comprising flavor and sweetening agents encapsulated in a matrix comprising:
  (i) at least one elastomer;
  (ii) at least one elastomer solvent;
  (iii) at least one wax system;
  (iv) an excipient selected from the group consisting of carbohydrates, polyhydric alcohols, and mixtures thereof; and
  (v) optionally spherical particles having microporous channels.

The delivery system is a homogenous matrix of at least those items listed (i)–(iv) above encapsulating the flavoring and/or sweetening agents. Those elastomers suitable for the matrix include chicle, jelutong, balata, guttapercha, lechi-caspi, sorva, butadiene-styrene copolymers, polyisobutylene, isobutylene-isoprene copolymers, polyethylene, and mixtures thereof. While it is not critical which of these elastomers or combination of these elastomers is present, it is preferred that the synthetic rubbers mentioned be used. The elastomers are present in the matrix of the delivery system in amounts of about 3% to about 40%, preferably in amounts of about 8% to about 16% and most preferably in amounts of about 10% to about 14% by weight of the chewing gum composition.

The elastomer solvents useful in the matrix of the delivery system include the pentaerythritol ester of partially hydrogenated wood rosin, pentaerythritol ester of wood rosin, glycerol ester of partially dimerized rosin, glycerol ester of polymerized rosin, glycerol ester of tall oil rosin, glycerol ester of wood rosin, glycerol ester of partially hydrogenated wood rosin, glycerol ester of partially hydrogenated methyl ester of rosin and mixtures thereof. The elastomer solvent used in the matrix of the delivery system may be used in amounts of about 8% to about 16%, preferably about 8% to about 14% and most preferably about 10% to about 13% by weight of the delivery system.

Waxes useful in the matrix of the delivery system include natural wax, polyolefin wax such as polyethylene wax and the like, paraffin wax, beeswax, microcrystalline wax and the like and mixtures thereof. They are generally present in the matrix in amounts of about 5% to about 24%, preferably about 10% to about 16% and most preferably about 12% to about 14% by weight of the chewing gum composition.

Chewing gum compositions of the instant invention have most of the sweetening and flavoring agents encapsulated in the matrix of the flavor/sweetener delivery system. Those sweetening agents used in the delivery system are the dipeptide based sweeteners including L-aspartyl-L-phenylalamine methyl ester and materials described in U.S. Pat. No. 3,492,131 and the like; water-soluble artificial sweeteners such as the soluble saccharin salts, i.e. sodium or calcium saccharin salts, cyclamate salts and the like, and the free acid form of saccharin; ace-sulfame K; talin; other synthetic, natural or artificial sweeteners and mixtures thereof. These sweeteners are present in the delivery system in amounts up to about 5.0% and most preferably in amounts of about 0.05 to about 0.25% by weight of the delivery system.

As described above, the matrix of the delivery system requires the incorporation of excipients selected from the class consisting of carbohydrate materials, polyhydric alcohols and mixtures thereof. Carbohydrates useful as excipients include traditional water-soluble sweetening agents such as monosaccharides, disaccharides and polysaccharides such as xylose, ribose, glucose, lactose, mannose, galactose, fructose, dextrose, sucrose, sugar, maltose, partially hydrolyzed starch, or corn syrup solids and sugar alcohols such as sorbitol, xylitol, mannitol and the like and mixtures thereof.

The excipients are generally present in amounts of amount 5% to about 60%, preferably about 20% to about 55% and most preferably in amounts of about 35% to about 50%, by weight of the delivery system. The excipients can be mixed in combination with each other or used individually depending upon the desired chewing gum composition.

Most preferred of the excipients are sugar, mannitol, sorbitol and mixtures thereof. While many of the useful excipients such as sugar, sorbitol etc., have an inherent sweetening effect, they function primarily in the delivery system as bulking agents and fillers to add structure and help achieve the desired consistency and viscosity.

The inventive delivery system can be added to conventional chewing gum compositions in amounts of about 0.2% to about 8% by weight of the final chewing gum composition and preferably in amounts of about 1% to about 5% and most preferably in amounts of about 1% to about 3% by weight. It is in no way critical to the instant invention which conventional chewing gum composition is used with the novel delivery system and such a determination can be made by routine experimentation and choice as to the particular formulation desired.

The spherical particles optional but useful in the matrix of the delivery system include any edible food material which is capable of being formed into particles having microporous channels. The products have preferred low bulk densities in the range of about 2.0 to about 25 lb./ft.$^3$ and preferably about 3.0 to about 6.0 lb./ft.$^3$. Materials, not having low bulk densities, coupled with microporous channels have been found not suitable for use in the inventive formulations. Such materials have been found to quickly release the flavoring liquid from the formulation and fail to sustain flavor-sweetness duration.

The optionally included spherical particles of the invention may be produced from a wide range of materials. Without being limited thereto, illustrative materials are carbohydrates such as the dextrins, starch, pectin, algin, methyl cellulose, carboxy methyl cellulose, carboxy methyl amylose, carboxy methylamylopectin, dextrose, fructose, maltose, lactose, dextrins, natural gums and mixtures thereof. Exemplary natural gums include tragacanth, acacia, arabic locust bean, caraya, and carragean. Although the are not critical to the inventive matrix, it is preferred that they be present as a means of increasing the juiciness of the chewing gum and masking any bitterness and harshness of the flavor at the end of chew, once the sweetness has been chewed-out.

Such materials are commercially available and may be prepared by spray drying previously expanded particles in a heated zone. For illustrative purposes, however, a preferred process for preparing the spherical particles useful in the instant formulations is described in U.S. Pat. No. 4,180,593 to Cohan, which reference teachings are incorporated herein by reference. Briefly the reference process involves spraying a flowable composition in the presence of a blowing agent, such as ammonium bicarbonate, to form beads, subjecting the beads to a heated zone to expand the beads by expansion of gases within the interior of the beads, and cooling the resulting expanded beads to stop further expansion and aid in control of bulk density.

The optionally-included spherical particles are employed in the matrix of the flavoring and/or sweetener agent delivery system in amounts of about 0.1% to about 12% by weight and preferably about 0.5% to about 6% by weight based on the weight of the final formulation. Amounts less than 0.1% fail to achieve enhanced flavor and sweetness perception whereas amounts higher than 12% does not achieve a pleasing flavor sweetness release.

The preferred spherical particle for use with this invention is a maltodextrin. This maltodextrin is distinct from known maltodextrins which have distinct particle sizes and are void of a microporous channel structure. Such conventional maltodextrins or corn syrup solids as they are commonly referred to, have bulk densities from 15 to 46 lb./ft.$^3$ and D.E. values from 7 to 38. Such materials are unsuitable for use in the present invention in lieu of the microporous particles. It should be recognized that such maltodextrins may be used in the instant formulations in addition to the spherical microporous particles. When used in this manner, they may be used in conventional amounts well known to the skilled inventor.

The spherical particles, when utilized, may be incorporated into the matrix of the delivery system of the chewing gum composition using standard techniques and equipment known to those skilled in the art. In a typical embodiment elastomer of the matrix is blended with the wax system together with the elastomer solvent under heat to modulate the hardness, viscoelasticity and formability of the matrix. The heating temperature is preferably around 77° C. to 88° C. The resulting elastomer mixture is then blended with the spherical particles and sweetening and flavoring agent, as well as the excipients, to form the delivery system. The spherical particles may have been previously blended with other ingredients including the flavoring agent. Once blending is achieved the delivery system is blended with a chewing gum composition while the chewing gum is being made, using standard and conventional techniques and formed into any suitable chewing gum shape.

More preferably, the delivery system is formed in a step-wise fashion comprising the steps of:

1. forming a homogenous mixture of elastomer, elastomer solvent and wax, wherein the mixture is formed by masticating the elastomer at about 77° to about 88° C., mixing in the solvent under steam pressure, finally adding wax in the absence of steam at about 20 to about 50 psi.;

2. Adding to this mixture another mixture comprising the excipient and the flavor and/or sweetener.

This temperature range is not critical and may deviate slightly either direction, depending on the choice of elastomers used. It is critical, however, that the temperature be such that softening or melting of the elastomers occurs to enable a homogenous mixture to be achreved once the other matrix ingredients are added.

The flavor and sweetener delivery system is now complete and the final temperature of this entire homogenous mixture is about 54° C. to about 60° C.

In the case where spherical particles are used, they may already have sorbed flavor and sweetening agents prior to addition to the encapsulating matrix, or alternatively flavor and sweetening agents can be added independently from the spherical particles. If the flavor and sweetening agents are added to the encapsulating matrix independently from the spherical particles, they are done so in a step-wise fashion at short intervals to insure they come into intimate contact with the spherical microporous channels and, having done so, become sorbed therewith and distributed through the matrix.

The next step in making the inventive chewing gum composition is to take the above flavor and sweetener delivery system and incorporate it in a conventional chewing gum formulation. The formulations are prepared by first melting or softening a gum base and mixing the gum base in a kettle with softener (e.g., corn syrup) and emulsifier (e.g., lecithin). Conventional base ingredients may be used to make the gum base. Mixing is continued and the flavor and sweetener delivery system is then added in amounts of about 0.2% to about 10%, and preferably about 1.5% to about 2.5% by weight of the final chewing gum composition. The mixture is then mixed for about 2 to about 4 minutes to evenly distribute the delivery system throughout the gum base. About $\frac{2}{3}$ to about $\frac{3}{4}$ of additional sweetening and flavoring agents are then added as well as color and other conventional chewing gum ingredients. Mixing is continued for about 2 to about 4 minutes and the remaining additional sweetener ingredients and other optional ingredients such as preservatives are added. The total mixture is then cooled, rolled and scored into chewing gum shapes and forms.

With regard to the chewing gum formulation in particular, the amount of gum base employed will vary greatly depending on various factors such as the type of base used, consistency desired and other components used to make the final product. In general, amounts of about 5% to about 45% by weight of the final chewing gum composition are acceptable for use in chewing gum compositions with preferred amounts of about 15% to about 25% by weight. The gum base used may be any water-insoluble gum base well known in the art. Illustrative examples of suitable polymers in gum bases include both natural and synthetic elastomers and rubbers. For example, those polymers which are suitable in gum bases, include, without limitation, substances of vegetable origin such as chicle, jelutong, gutta percha and crown gum. Synthetic elastomers such as butadiene-styrene copolymers, isobutylene-isoprene copolymers, polyethylene, polyisobutylene, polyvinylacetate and mixtures thereof, are particularly useful.

The gum base composition may contain elastomer solvents to aid in softening the rubber component. Such elastomer solvents may comprise methyl, glycerol or pentaerythritol esters of rosins or modified rosins, such as hydrogenated, dimerized or polymerized rosins or mixtures thereof. Examples of elastomer solvents suitable for use herein include the pentaerythritol ester of partially hydrogenated wood rosin, pentaerythritol ester of wood rosin, glycerol ester of partially dimerized rosin, glycerol ester of polymerized rosin, glycerol ester of tall oil rosin, glycerol ester of wood rosin and partially hydrogenated wood rosin and partially hydrogenated methyl ester of rosin, such as polymers of $\alpha$-pinene or $\beta$-pinene; terpene resins including polyterpene and mixtures thereof. The solvent may be employed in an amount ranging from about 2% to about 20% and preferably about 5% to about 15% by weight of the gum base.

A variety of traditional ingredients such as plasticizers or softeners including lanolin, stearic acid, sodium stearate, potassium stearate, glyceryl triacetate, glycerine and the like for example, natural waxes, petroleum waxes, such as polyethylene waxes, paraffin waxes and microcrystalline waxes may also be incorporated into the gum base to obtain a variety of desirable textures and consistency properties. These individual additional materials are generally employed in amounts of up to about 30% by weight and preferably in amounts of from about 3% to about 20% by weight of the final gum base composition.

The gum compositions generally contain a major portion of a sweetening agent. These sweetening agents are independent from the excipients and sweetening agents used in the delivery system described above. Sweetening agents may be selected from a wide range of materials such as water-soluble sweetening agents, water soluble artificial sweeteners, and dipeptide based sweeteners, including mixtures thereof. Without being limited to particular sweeteners, representative illustrations encompass:

A. Water-soluble sweetening agents such as monosaccharides, disaccharides and polysaccharides such as xylose, ribose, glucose, mannose, galactose, fructose, dextrose, sucrose, sugar, maltose, partially hydrolyzed starch, or corn syrup solids and sugar alcohols such as sorbitol, xylitol, mannitol and mixtures thereof.

B. Water-soluble artificial sweeteners such as the soluble saccharin salts, i.e. sodium or calcium saccharin salts, cyclamate salts and the like, and the free acid form of saccharin.

C. Dipeptide based sweeteners include L-aspartyl-L-phenylalanine methyl ester and materials described in U.S Pat. No. 3,492,131 and the like.

In general, the amount of sweetener will vary with the desired amount of sweetener selected for a particular chewing gum composition. This amount will normally be about 0.01% to about 90% by weight when using an easily extractable sweetener. The water-soluble sweeteners are preferably used in amounts of about 25% to about 75% by weight, and most preferably about 50% to about 65% by weight of the final chewing gum composition.

In contrast, the artificial sweeteners described in categories B and C are used in amount of about 0.01 to about 5.0% and most preferably about 0.05% to about 0.25% by weight of the final chewing gum composition. These amounts are necessary to achieve a desired level of sweetness independent from the flavor level achieved from the flavor oil.

The chewing gum composition of this invention may additionally include the conventional additives of coloring agents such as titanium dioxide; emulsifiers such as lecithin and glyceryl monostearate; and additional fillers such as aluminum hydroxide, alumina, aluminum silicates, calcium carbonate, and talc and combinations thereof. These fillers may also be used in the gum base in various amounts. Preferably the amount of fillers when used will vary from about 4% to about 30% by weight of the final chewing gum.

Flavoring agents well known to the chewing gum art may be added to the chewing gum compositions of the instant invention. These flavoring agents may be chosen from synthetic flavoring liquids and/or liquids derived from plants, leaves, flowers, fruits and so forth, and combinations thereof. Representative flavoring liquids include: spearmint oil, cinnamon oil, oil of wintergreen (methylsalicylate) and peppermint oils. Also useful are artificial, natural or synthetic fruit flavors such as citrus oil including lemon, orange, grape, lime and grapefruit and fruit essences including apple, strawberry, cherry, pineapple and so forth.

The amount of flavoring agent employed is normally a matter of preference subject to such factors as flavor type, base type and strength desired. In general, amounts of about 0.05% to about 3.0% by weight of the final chewing gum composition are usable with amounts of about 0.3% to about 1.5% being preferred and about 0.7% to about 1.2% being most preferred.

In the instance where the spherical particles are used in the delivery system, the flavoring agent is preferably employed in its liquid oil form in order to achieve maximum sorption within the spherical particles.

However, since the spherical particles are merely optional, it should be recognized that additional flavoring agents having distinct physical forms may be added to the chewing gum composition. Without being limited thereto, such physical forms include spray dryed, powdered flavoring, beaded flavoring and encapsulated flavoring. As previously emphasized, the flavor and/or sweetener prolongation properties of the invention are due to the substantially hydrophobic character of the matrix of the delivery system.

The following examples are given to illustrate the invention, but are not deemed to be limiting thereof. All percentages given throughout the specification are based upon weight unless otherwise indicated.

EXAMPLE 1

This example demonstrates the use of the inventive flavor and sweetener delivery systems as a means of giving a sustained flavor and sweetener release in chewing gum compositions.

Table I demonstrates various flavor delivery system formulations for sugar-containing chewing gums. As indicated, maltodextrin is chosen as the spherical particles having microporous channels.

Table II demonstrates various sweetener delivery systems for both sugarless and sugar-containing chewing gum.

Table III demonstrates various delivery systems for flavor and sweeteners in combination.

These delivery systems were each prepared in the same manner as discussed in detail above.

TABLE I

INVENTIVE FLAVOR DELIVERY SYSTEMS
(% based on weight of delivery system)

| Ingredient | Inventive One | Inventive Two | Inventive Three |
|---|---|---|---|
| Elastomer | 8 | 16 | 13 |
| Elastomer solvent | 20 | 16 | 13 |
| Wax System | 12 | 12 | 13 |
| Mannitol | — | 9 | — |
| Maltodextrin | 6 | — | — |
| Sorbitol | — | 11 | — |
| Sugar | 30 | — | 37 |
| Flavor (peppermint oil or spearmint oil) | 24 | 36 | 24 |

TABLE II

INVENTIVE SWEETENER DELIVERY SYSTEMS
(% based on weight of delivery system)

| Ingredient | Inventive Four | Inventive Five | Iventive Six |
|---|---|---|---|
| Elastomer | 8 | 16 | 12 |
| Elastomer solvent | 20 | 16 | 13 |
| Wax System | 12 | 12 | 12 |
| Mannitol | 56 | — | 18 |
| Sorbitol | — | 40 | 40 |
| Xylitol | — | 13 | — |
| Aspartame | 4 | — | — |
| Saccharine | — | 3 | — |
| Ace-sulfame K | — | — | 5 |

TABLE III

INVENTIVE DELIVERY SYSTEMS FOR FLAVOR AND SWEETENER
(% based on weight of delivery system)

| Ingredient | Inventive Seven | Inventive Eight | Inventive Nine |
|---|---|---|---|
| Elastomer | 8 | 16 | 13 |
| Elastomer solvent | 20 | 16 | 13 |
| Wax System | 12 | 12 | 13 |
| Sorbitol | — | — | 22 |
| Mannitol | — | 15 | 10 |
| Maltodextrin | 8 | — | — |
| Sugar | 22 | — | — |
| Flavor | 24 | 36 | 24 |
| Saccharin | 4 | — | 5 |
| Ace-sulfame K | — | 5 | — |

EXAMPLE 2

Table IV recites a series of chewing gum compositions. Formulations marked "Comparative A" and "Comparative B" exemplify the prior art where the flavor is added directly to the gum base. Those formulations marked "Inventive A" through "Inventive E" exemplify chewing gum compositions containing the inventive chewing delivery systems recited in Tables I–III, as marked.

The inventive chewing gum formulations B–E were prepared in accordance with the inventive process as detailed above. The comparative formulations were made using conventional process steps. In comparative A and B the flavor was added toward the end of mixing to avoid undue volatilization.

The compositions were cooled, rolled and scored into appropriate gum shapes and double blind tested on an expert chewing gum panel. The panelists were asked to chew each gum for a total of fifteen (15) minutes and give an evaluation as to sweetness and intensity of flavor at intervals of 2, 5, 7 and 15 minutes respectively. The results are shown graphically in FIGS. 1–2.

FIG. 1 concerns the intensity of flavor of peppermint chewing gums. At the 2 minute interval and beyond, the inventive chewing gums are perceived as being significantly higher intensity of flavor than both of the comparative prior art chewing gums.

FIG. 2 shows that initially in the first few minutes, there is little difference between the inventive chewing gums and those of the prior art. At the 12 minute interval, however, comparative A and B in which the flavor is not encapsulated but is added directly to the chewing gum, was perceived as being significantly less sweet than the inventive chewing gums containing the novel delivery system. At the 15 minute chew point, the inventive gums are perceived as being significantly sweeter than both types of prior art gums (comparative A and B).

The flavor for each formulation represented in Figures was peppermint.

TABLE IV

| | CHEWING GUM FORMULATIONS | | | | | | |
|---|---|---|---|---|---|---|---|
| | COMPARATIVE | | INVENTIVE | | | | |
| INGREDIENT | A | B | A | B | C | D | E |
| Gum Base | 25.0 | 35.0 | 15.0 | 25.0 | 25.0 | 35.0 | 40.0 |
| Corn Syrup | 20.0 | 15.0 | — | 20.0 | 30.0 | 15.0 | 5.0 |
| Sugar | 51.1 | 36.5 | 66.8 | 48.1 | 36.0 | 32.5 | 23.0 |
| Maltodextrin | — | 5.0 | 15.0 | — | — | 5.0 | 15.0 |
| Softener | 2.0 | 5.0 | 2.0 | 2.0 | — | 5.0 | 5.0 |
| Flavor (liquid) | 1.0 | 1.5 | 2.0 | 1.0 | 2.0 | 1.5 | 2.0 |
| Spray Dried Flavor | 0.9 | 2.0 | 0.2 | 0.9 | 2.0 | 2.0 | 2.0 |
| Flavor and Sweetener Delivery System | — | — | (a)0.5 | (b)3.0 | (c)5.0 | (d)4.0 | (e)8.0 |

(a) Inventive Two Delivery System (See TABLE I)
(b) Inventive Five Delivery System (See TABLE II)
(c) Inventive Seven Delivery System (See TABLE III)
(d) Inventive Three Delivery System (See TABLE I)
(e) Inventive One Delivery System (See TABLE I)

EXAMPLE 3

Sugarless chewing gum compositions were prepared using the inventive delivery systems two, four, five, six, eight and nine (Tables I and III). These delivery systems were incorporated in conventional chewing gum compositions and formed into chewing gum pieces. The chewing gums were then compared against competitive sugarless chewing gums having flavor and sweetener added directly to the chewing gum composition along with the other ingredients as is traditional in the art.

The chewing gum pieces were then tested by an expert panel in the same manner as Example 2. The panel was requested to evaluate the chewing gums for flavor intensity and sweetness at intervals of 2, 5, 7 and 15 minutes respectively.

The results were similar to Example 2 in that at about 10 to 12 minutes of chew time, the inventive compositions were perceived to have more flavor impact and sweetness than the comparative examples of the prior art. These results indicate that the sweetness and flavor of the chewing gum composition has sustained release over a significant period of chew time.

Additional chewing gum formulations were made wherein the flavor was put directly into conventional chewing gum base in an attempt to achieve similar results in flavor prolongation as achieved with the inventive delivery systems. These formulations, modeled after comparative formulations A and B in Table IV, resulted in unacceptable chewing gums having extremely sloppy chew due to plasticization of the gum base, a bitter and harsh taste in a short chew time and a short duration of flavor, with little or no flavor after about seven minutes of chew time.

It is apparent that the inventive chewing gum sweetener and/or flavor delivery system produces novel chewing gum compositions with superior prolongation of flavor and/or sweetness without the disadvantages of the prior art as discussed above.

The invention being thus described, it will be obvious that the same may be varied in many ways. Such variations are not to be regarded as a departure from the spirit and scope of the invention and all such modifications are intended to be included within the scope of the claims.

What is claimed is:

1. A chewing gum composition having sustained flavor and sweetener release comprising (a) a gum base in an amount of from about 5% to about 45% by weight of said chewing gum composition to which is added;
(b) a flavor and sweetener delivery system in an amount of from about 0.2% to about 10% by weight of said chewing gum composition, said delivery system comprising flavor and/or sweetening agents encapsulated in a substantially hydrophobic matrix formed in the absence of added emulsifiers, wherein said matrix comprises:
  (i) at least one elastomer in an amount of from about 3% to about 40% by weight of said matrix;
  (ii) at least one wax system in an amount of from about 5% to about 24% by weight of said matrix;
  (iii) at least one elastomer solvent in an amount of from about 8% to about 14% by weight of said matrix; and
  (iv) an excipient selected from the group consisting of carbohydrates, polyhydric alcohols, and mixtures thereof in an amount of from about 5% to about 60% by weight of said matrix; and
  (v) optionally, edible spherical food particles having microporous channels and having a bulk density of from about 2.0 to about 25.0 lbs./ft$^3$.

2. The chewing gum composition of claim 1 wherein the delivery system is present in amounts of about 1.5% to about 10% by weight of the final chewing gum composition.

3. The chewing gum composition of claim 1 wherein the flavor agents are present in the amount of about 0.05% to about 3.0% by weight of the final chewing gum composition.

4. The chewing gum composition of claim 1 wherein the sweetening agents are present in the delivery system in amounts of about 0.05% to about 5% by weight of the final chewing gum composition.

5. The chewing gum composition of claim 4 wherein the flavor agents are selected from the group consisting of artificial flavoring agents, natural flavoring agents and mixtures thereof.

6. The chewing gum composition of claim 5 wherein the flavor agents are selected from the group consisting of spearmint oil, cinnamon oil, oil of wintergreen (methylsalicylate), peppermint oil, lemon oil, orange oil, grape oil, lime oil, grapefruit oil, apple essence, strawberry essence, cherry essence, pineapple essence and mixtures thereof.

7. The chewing gum composition of claim 5 wherein the sweetening agent is a water-soluble sweetener selected from the group consisting of monosaccharides, disaccharides, polysaccharides, polyhydric sugar alcohols, dipeptide based sweeteners, saccharin salts, cyclamate salts, the free acid form of saccharin and mixtures thereof.

8. The chewing gum composition of claim 8 wherein the sweetening agent is selected from the group consisting of xylose, ribose, glucose, mannose, sucrose, galactose, fructose, dextrose, maltose, partially hydrolyzed starch, corn syrup solids, sorbitol, xylitol, mannitol sodium saccharin, calcium saccharin, L-aspartyl-L-phenylalanine methyl ester and mixtures thereof.

9. The chewing gum composition of claim 2 wherein the sweetening agent is a combination of about 3% to about 6% acid saccharin or aspartame and the excipient is about 50% to about 60% polyhydric sugar alcohol, by weight of the final chewing gum composition.

10. The chewing gum composition of claim 9 wherein the polyhydric sugar alcohol is selected from the group consisting of mannitol, sorbitol, xylitol and mixtures thereof.

11. The chewing gum composition of claim 1 wherein the elastomer of the matrix is selected from the group consisting of natural rubber, synthetic rubber and mixtures thereof.

12. The chewing gum composition of claim 11 wherein the elastomer is selected from the group consisting of chicle, jelutong, balata, gutta-percha, lechi-caspi, sorva, butadiene-styrene copolymers, polyisobutylene, polyethylene, isobutylene-isoprene copolymers and mixtures thereof.

13. The chewing gum composition of claim 1 wherein the elastomer solvent in the delivery system is selected from the group consisting of the pentaerythritol ester of partially hydrogenated wood rosin, pentaerythritol ester of wood rosin, glycerol ester of partially dimerized rosin, glycerol ester of polymerized rosin, glycerol ester of tall oil rosin, glycerol ester of wood rosin, glycerol ester of partially hydrogenated wood rosin, glycerol ester of partially hydrogenated methyl ester of wood rosin and mixtures thereof.

14. The chewing gum composition of claim 1 wherein the wax system is selected from the group consisting of natural wax, bees wax, polyethylene wax, paraffin wax, microcrystalline wax and mixtures thereof.

15. The chewing gum composition of claim 1 wherein the elastomer is present in amounts of about 30% to about 50% by weight of the total flavor and sweetening agent delivery system.

16. The chewing gum composition of claim 1 wherein the gum base comprises an elastomer selected from the group consisting of natural rubber, synthetic rubber and mixtures thereof.

17. The chewing gum composition of claim 16 wherein the gum base elastomer is selected from the group consisting of chicle, jelutong, balata, gutta-percha, lechi-caspi, sorva, butadiene-styrene copolymers, polyisobutylene, isobutylene-isoprene copolymers polyethylene, polyvinylacetate, and mixtures thereof.

18. The chewing gum composition of claim 17 wherein the gum base is present in the amounts of about 5% to about 45% by weight of the final chewing gum composition.

19. The chewing gum composition of claim 1 wherein there is additionally included fillers, coloring agents, flavoring agents, softeners, plasticizers, elastomers, elastomer solvents, sweetening agents and mixtures thereof.

20. The chewing gum composition of claim 1 wherein the spherical particles are selected from the group consisting of dextrins, starch, pectin, algin, methyl cellulose, carboxy methyl cellulose, carboxy methyl amylose, carboxy methyl amylopectin, dextrose, fructose, maltose, lactose, dextrans, natural gums and mixtures thereof.

21. The chewing gum composition of claim 1 wherein the spherical particles are maltodextrins having a bulk density of about 3.0 to about 6.0 lbs./cu. ft.

22. A method of preparing a chewing gum composition having sustained flavor and sweetener release comprising
(a) preparing a substantially hydrophobic flavor and sweetener delivery system in the absence of emulsifiers comprising the steps of:
  (i) admixing a masticated elastomer with an elastomer solvent and a wax system at a temperature of about 77° C. to about 88° C. to obtain a homgenous mixture;
  (ii) adding to this mixture a flavoring agent and an excipient and mixing these additives to obtain a homogenous mixture; and
  (iii) optionally adding to this homgenous pliable mixture spherical particles having microporous channels and continuing to mix to enable the sweetening agent to be sorbed into the spherical particles; and
(b) adding the resultant delivery system to a mixture of gum base and remaining chewing gum ingredients;
(c) forming the resultant mixture into suitable chewing gum shapes.

23. A method of preparing a chewing gum composition having sustained flavor and a sweetener release comprising
(a) preparing a substantially hydrophobic delivery system containing no emulsifiers comprising the steps of:
  (i) admixing an elastomer with an elastomer solvent and a wax system at a temperature of about 77° C. to about 88° C. to obtain a homogeneous mixture;
  (ii) adding to this mixture another mixture comprising an excipient and sweetener; and
  (iii) mixing in spherical particles having a flavoring agent sorbed therein;
(b) adding the resultant delivery system to a homogenous mixture of a gum base and remaining chewing gum ingredients; and
(c) forming the resultant mixture into suitable chewing gum shapes.

24. The method of claim 1 wherein the elastomer solvent of plasticizer are each added in increments at about three to six minute intervals.

25. The method of claim 1 wherein the flavor and excipient are each added in separate increments.

26. A substantially hydrophobic matrix for encapsulating flavor and sweetening agents prepared in the absence of added emulsifiers for use in chewing gum compositions to prolong the sweetness and flavor of said gum comprising:
  at least one elastomer having substantially no added resins in an amount of from about 3% to about 40%;
  at least one elastomer solvent in an amount of from about 8% to about 14%;
  at least one wax system in an amount of from about 5% to about 24%; and
  an excipient selected from the group consisting of carbohydrates, polyhydric alcohols, and mixtures thereof in an amount of from about 5% to about 60%, said matrix formed in the absence of emulsifiers.

27. The matrix of claim 26 which further comprises particles having microporous channels in an amount of from about 0.1% to about 12% by weight.

28. The matrix of claim 27 wherein said amount of spherical particles is from about 0.5% to about 6% by weight.

29. The matrix of claim 27 wherein said particles are spherical particles having a bulk density of from about 2.0 to about 25 lbs/ft$^3$.

30. The matrix of claim 29 wherein said bulk density is from about 3.0 to about 6.0 lbs/ft$^3$.

31. The matrix of claim 27 wherein said particles are produced from materials selected from the group consisting of dextrins, starch, pectin, algin, methyl cellulose, carboxy methyl cellulose, carboxy methyl amylose, carboxy methylamylopectin, dextrose, fructose, maltose, lactose, dextrins, natural gums and mixtures thereof by weight of said delivery system.

32. The matrix of claim 31 wherein said natural gum is selected from the group consisting of tragacanth, acacia, arabic, locus bean, caraya, and carragean.

33. The matrix of claim 31 wherein said particles are maltodextrin particles.

34. The matrix of claim 26 wherein said sweetening agent is selected from the group consisting of L-aspartyl-L-phenylalamine methyl ester, soluble saccharin salts, free acid form of saccharin, ace-sulfame K, talin, and mixtures thereof in an amount of up to about 5.0% by weight of said matrix.

35. The matrix of claim 34 wherein said sweetening agent is included in an amount of from about 0.05% to about 0.25% by weight of said delivery system 36. The matrix of claim 26 wherein said excipient is selected from the group consisting of monosaccharides, disaccharides and polysaccharides such as xylose, ribose, glucose, lactose, mannose, galactose, fructose, dextrose, sucrose, sugar, maltose, partially hydrolyzed starch, or corn syrup solids and sugar alcohols selected from the group consisting of sorbitol, xylitol, mannitol and mixtures thereof.

37. The matrix of claim 36 wherein said excipient is selected from the group consisting of sugar, mannitol, sorbital and mixtures thereof.

38. The matrix of claim 26 wherein said excipient is included in an amount of from about 20% to about 55% based on weight.

39. The matrix of claim 38 wherein said amount is from about 35% to about 50% based on weight.

40. The matrix of claim 26 wherein said wax system comprises wax selected from the group consisting of natural wax, polyolefin wax, polyethylene wax, paraffin wax, beeswax, microcrystalline wax and mixtures thereof.

41. The matrix of claim 26 wherein said wax system is included in an amount of from about 10% to about 16% by weight.

42. The matrix of claim 41 wherein said wax system is included in an amount of from about 12% to about 14% by weight.

43. The matrix of claim 26 wherein said elastomer is selected from the group consisting of natural rubber, synthetic rubbers and mixtures thereof.

44. The matrix of claim 43 wherein said elastomer is selected from the group consisting of chicle, jelutong, balata, guttapercha, lechi-caspi, sorva, butadiene-styrene copolymers, polyisobutylene, isobutylene-isoprene copolymers, polyethylene, and mixtures thereof.

45. The matrix of claim 44 wherein said elastomer is selected from the group consisting of butadiene-styrene copolymers, polyisobutylene, isobutylene-isoprene copolymers, polyethylene, and mixtures thereof.

* * * * *

UNITED STATES PATENT AND TRADEMARK OFFICE
CERTIFICATE OF CORRECTION

PATENT NO. : 4,590,075
DATED : May 20, 1986
INVENTOR(S) : Wei et al.

It is certified that error appears in the above—identified patent and that said Letters Patent is hereby corrected as shown below:

In Claim 32, the spelling of the word "locus" should be corrected to read --locust--.

In Claim 34, the spelling of the word "L-aspartyl-L-phenylalamine" should be corrected to read --L-aspartyl-L-phenylalanine--.

Signed and Sealed this

Twenty-sixth Day of August 1986

[SEAL]

Attest:

DONALD J. QUIGG

Attesting Officer

Commissioner of Patents and Trademarks